Patented Mar. 21, 1933

1,902,642

UNITED STATES PATENT OFFICE

CHARLES G. HARFORD, OF QUINCY, MASSACHUSETTS, ASSIGNOR TO THE PHILADELPHIA & READING COAL & IRON COMPANY, OF PHILADELPHIA, PENNSYLVANIA, A CORPORATION OF PENNSYLVANIA

METHOD OF COATING AND COATING COMPOSITION

No Drawing.   Application filed December 12, 1928.   Serial No. 325,653.

This invention relates to a method of applying coating films and to an improved liquid coating composition which may be utilized in practicing the method. The object of the invention is to provide an exceedingly cheap coating which may be used for covering inexpensive bulk goods or large surfaces. For instance, color may without undue expense be applied to coal or similar materials to serve as an indication of origin and when so used may be applied to the material while the latter is wet.

My invention may be well understood by reference to the following description.

In practicing my invention I may utilize a water vehicle paint of which the solid phase consists essentially of suitably colored fibrous pulp. Such pulp I have found has the property of adhering to wood or mineral surfaces. To prevent the film from washing off there may be incorporated with the pulp a suitable water-resisting ingredient, such, for instance, as oil, wax, resin, latex or other organic water-repellent substance.

Wood pulp or a similar cellulosic pulp is conveniently adaptable for making a water vehicle paint although wool pulp (in the form of shoddy) may desirably be utilized in some instances on account of its affinity for certain dyes. The quality of pulp used may vary somewhat with the desired character of the resulting composition. The cheapest material is old newspapers, but more enduring and better adhering paint may be prepared from a better quality of pulp, such, for instance, as bleached sulphite pulp. In general it appears that the quantity of mechanical pulp present adversely affects the durability of the composition. The pulp may be thoroughly beaten with water in an ordinary paper beater or by a similar machine or machines, until sufficiently finely divided to permit it to be handled in the ordinary spray gun, but preferably not in such manner as to effect a complete hydration. The material as I have utilized it is in a fine fibrous, semi-gelatinous, adhesive condition with some flocculent matter present, but has no marked felting tendency.

The pulp is suitably colored by means of suitable dyestuffs introduced in the beater or suitable mineral pigments. Among dyes may be mentioned Rhodamin, Para red and dyes of the croceine group, while the various chrome colors are adapted for use as pigments.

Before the beating is completed, a suitable water-resisting agent is incorporated. For this purpose paraffin is desirably cheap and gives good results and may be intermingled with the pulp in the beater as a dispersion of particles. The amount of paraffin may be from ten to seventy-five percent by weight of the dry pulp, here again the enduring quality of the coating to be produced influencing the choice. In the case of larger proportions of paraffin an agent may be added to aid in bringing it to a dispersed or emulsified state. Thus by way of example I have had good results from the following. Utilizing 2000 pounds weight of dry bleached sulfite pulp, 1500 pounds of paraffin are melted and into this is thoroughly stirred 18 gallons of benzol (about 125 pounds). The mixture is stirred into the pulp in the beater to provide a dispersion or suspension of the paraffin therein and a thorough intermingling of the water-repellent agent with the pulp particles.

To apply this material as a coating it may be conveniently utilized in such a concentration that the solids, that is, the suspended phase as contrasted with the vehicle, constitute about 3% by weight of the fluid paint material, the vehicle being water. This may be applied with an ordinary spray gun, and when the water vehicle evaporates, a film of colored pulp, continuous as seen by the naked eye, remains. The paraffin intermixed with the pulp gives the film water-resisting qualities. While I refer to a film it will be understood that for certain uses, as, for instance, coloring coal, a complete coating of the material need not necessarily be attempted, but where the color is applied it will be a thin layer in the nature of a film, and that this film will appear to ordinary inspection as a continuous one in the areas covered.

It will be noted that the solid phase of the coating material described consists of wood pulp and a waterproofing agent. Any other solids which may be present, as, for example, ingredients of the news-print when used as a raw material or clay present when an organic dye is introduced in the form of a paste or lake, are in small amounts and are not significant and in a sense accidental.

I am aware that wood pulp has been used in oil paints as a filler or as a substitute for pigment in a film of oxidizing oil and also that in connection with a substantial quantity of other solids it has been used in water paints in the nature of lime paints or casein paints, there likewise serving as a filler. This I do not claim. My invention involves utilizing a suspension of fibrous pulp such as wood pulp or like material to provide an adherent film consisting of water-resisting fibrous particles on the work.

Having described my invention and, by way of illustration only, given detailed examples thereof, what I claim as new and desire to secure by Letters Patent I shall express in the following claims:

1. A coating composition for spraying coal, consisting of finely divided colored cellulose pulp of sprayable fineness distributed through an aqueous suspension of a water repellent substance.

2. A coating composition for spraying coal, consisting of an aqueous suspension of cellulose pulp of sprayable fineness intermixed with from 10 to 75 percent of paraffin wax in benzol distributed therethrough.

In testimony whereof, I have signed my name to this specification.

CHARLES G. HARFORD.